United States Patent [19]

Backowski

[11] 3,790,206
[45] Feb. 5, 1974

[54] VEHICLE STABILIZING MEANS AND METHOD

[76] Inventor: Henry J. Backowski, 716 Indiana Ct., Apt. 40, El Segundo, Calif. 90245

[22] Filed: July 17, 1972

[21] Appl. No.: 272,691

[52] U.S. Cl.............................. 296/1 S, 180/1 FV
[51] Int. Cl............................................ B62d 37/02
[58] Field of Search..... 296/1 S; 180/1 FV; 105/2 A

[56] References Cited
UNITED STATES PATENTS
3,618,998   11/1971   Swauger.............................. 296/1 S

*Primary Examiner*—Richard E. Aegerter
*Assistant Examiner*—James W. Miller
*Attorney, Agent, or Firm*—Edward A. Sokolski et al.

[57] ABSTRACT

A device for stabilizing vehicles, particularly racing cars, and a method of stabilization utilizing same which comprises a flat movable pressure plate which is hinged at adjacent the front of a vehicle and can be controllably moved upward or downward in accordance with the air pressure exerted thereon. A pivotal pressure plate is connected to the rear of the flat pressure plate and can move in accordance wherewith to maintain air pressure on the flat pressure plate. Movable side fences are additionally provided to confine air onto the top surface of the flat pressure plate and act as four rudder stabilizers at all times. A similar flat movable pressure plate arrangement with a second pivotal pressure plate and side fences is provided at the rear of the car behind the driver and the top rear surface of the vehicle. Air deflectors, particularly at the rear of the car, are also provided.

17 Claims, 9 Drawing Figures

PATENTED FEB 5 1974 3,790,206
SHEET 1 OF 2
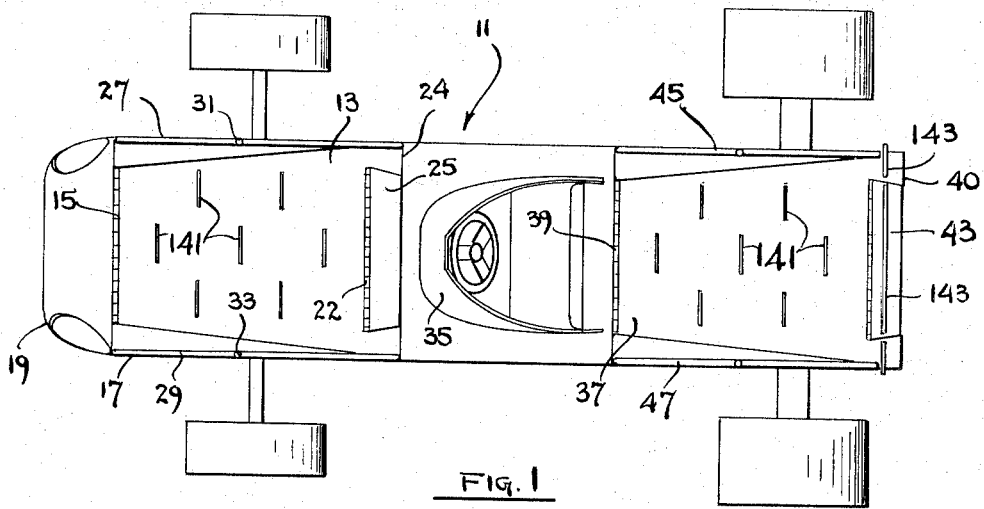
FIG. 1
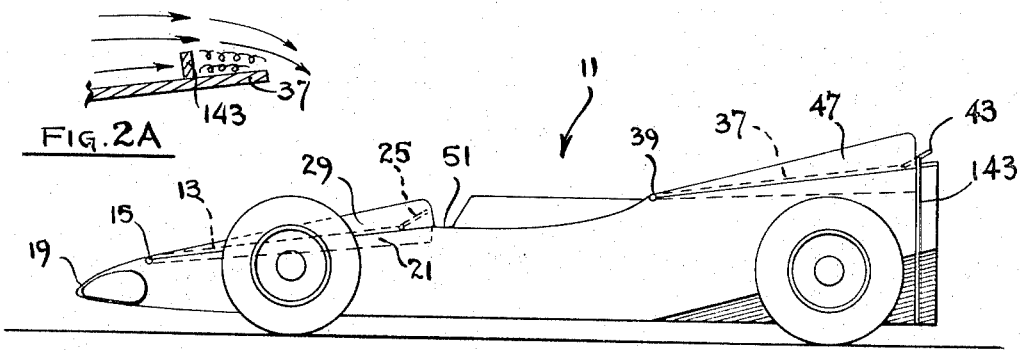
FIG. 2A
FIG. 2
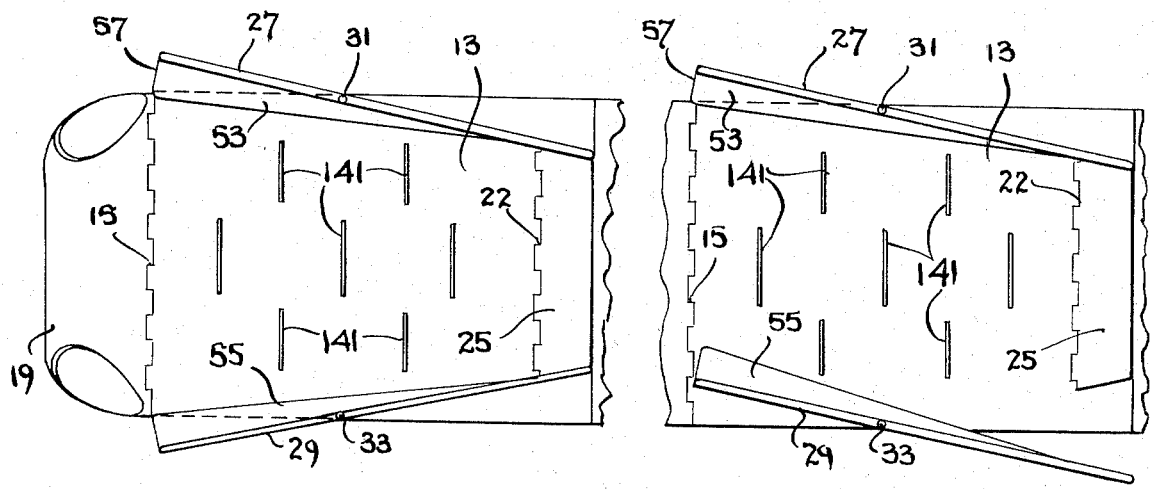
FIG. 5
FIG. 6

VEHICLE STABILIZING MEANS AND METHOD

In the past, it has been recognized that it is particularly desirable to utilize the force of surrounding air pressure to control the movement of vehicles, particularly racing cars. As a result, there have been various design utilized to take advantage of this air pressure. Most typically, the prior art devices have taken the form of movable wings or veins mounted at particular locations on the vehicle. These movable veins or wings were utilized to increase the downward pressure on the vehicle as the air passed thereover, in many instances, so as to improve the frictional contact between the vehicle and the surface on which it is moving. This was particularly desirable in turns and the movable veins or wings were utilized to prevent skidding in the turn areas particularly. In order to prevent skidding and obtain control over the car, many of the vents or veins were located at the rear of the car or adjacent the rear wheels generally behind the cockpit of a racing car. Very little effort was directed in most practical applications to controlling the forces at the front of the vehicle. There are several drawbacks to the previous veins and wings. Firstly, most of them were spatially disposed from the main chassis of the vehicle, either above or to the side of the vehicle. This introduced considerable stresses on the support structures, therefore, as well as effecting the bulkiness of the vehicle. In effect, this coupled jet engine performance with bi-plane aerodynamics. Additionally, veins and wings have limited surface area. Due to the relatively small surface area involved, the amount of downward pressure that can be exerted on the vehicle is minimized. More particularly, above 200 miles per hour these devices are progressively ineffective, and in fact, detrimental since they perform less function. Heretofore, there has been no means for moving the wings or similar devices away from the car so that they in effect do not present drag force or alternatively, actually cause a lift/drag in balance to occur when 200 miles per hour plus is reached. Because of this, it has been difficult to successfully incorporate these devices in cars where speeds over 200 miles an hour are desirable or achievable without suffering severe consequences.

The herein invention provides means for maximizing the pressure that can be exerted on a car or vehicle due to the force of air, to aid in traction, steerability and control, while further controlling the effect of the air in accord with the speed achieved such that at extremely high speeds, over 200 miles an hour, there is presented little resistance to the air and the device of the invention does not inhibit but rather in fact helps improve the controllability of the car at high speeds. Thus, the faster the speed, the cleaner it is aerodynamically.

Briefly, the apparatus illustrative of invention comprises a spring-loaded flat pressure plate at the front of the car which extends from the front of the car to adjacent the cockpit area. The pressure plate slopes upwardly from adjacent the front edge of the car toward the cockpit and is preferably spring-loaded in a slightly upward extending position. A similar flat plate is provided at the upper rear of the vehicle. On the rear of each pressure plate, there is pivotally mounted a second pressure plate which extends upwardly from the first flat pressure plate at lower speeds and serves to maintain the flow of air onto the flat pressure plate. Additionally, there is a side fence on each side of each of the flat pressure plates, extending longitudinally thereof to further confine air onto the surface of the plate. The side fences may be mounted so that they will in effect funnel air onto the flat pressure plate during starting and lower speeds and will then adjust themselves in response to air flow. Thus, when the car goes into a turn or the like, the veins further aid in the stabilization of the car. As the speed of the car increases, the pressure on the pressure plates correspondingly increases, the spring pressure is overcome and the pressure plates are depressed downwardly. This exerts an additional downward force on the body of the car and increases the traction of the wheels. As the speed increases to 200 miles an hour, the pressure plate inclination angle lies generally flatter with the remaining portion of the chassis and the spring pressure is maximized. In this position, the second pivotal pressure plate is generally aligned with the first flat pressure plate and presents minimal resistance to the air flow. It is preferred that the pressure plates additionally have air deflectors thereon in order to effectively maintain the air on the plates during the movement of the car. These are particularly important at the rear of the vehicle. The two pressure plates serve to counterbalance each other at all times.

It is believed that the invention will be further understood from the following detailed description and drawings in which:

FIG. 1 is a top plan view of a car incorporating the herein invention.

FIG. 2 is a side view of a car of FIG. 1.

FIG. 5 is a top plan view of a front portion of a car of this invention.

FIG. 6 is a top plan view of a front portion of a car of this invention.

FIG. 2A is an enlarged section of the rear edge of the rear pressure plate showing the air deflectors thereon.

Figure 3:
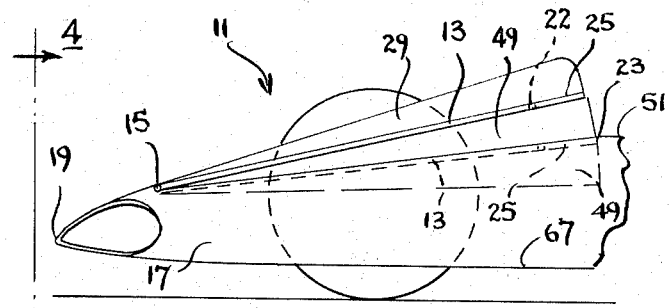
FIG. 3 is a partial side view of a front of a car moving at low speeds.

Turning now to the drawings, there is seen in FIGS. 1 and 2 a car incorporating the aspects of the herein invention. The car is a racing car which is normally that tye of vehicle which would utilize the principles described herein. The car 11 is provided with a front flat pressure plate 13 which is pivotally mounted at 15 on the chassis 17 of the car adjacent the front end 19 thereof. At rest position, the pressure plate is slightly raised above the side portions 21 of the chassis due to spring force which will be described in further detail. Pivotally mounted at 22 adjacent a rear 24 of the pressure plate 13 is a second movable pressure plate 25. Two fences, 27 and 29 respectively, are pivotally mounted at 31 and 33 on opposite sides of the pressure plate 13. The pressure plate 13 is disposed so that it is sloping upwardly from the front end 19 of the car toward a cockpit area 35. Behind the cockpit area 35 there is located a rear pressure plate 37 which is pivotally connected at 39 to the chassis behind the cockpit area 35. The rear pressure plate 37 slopes upwardly from the pivot point 39 to adjacent the rear end 40 of the vehicle. Adjacent the rear of the pressure plate 37, there is pivotally connected a second moveable pressure plate 43 in the same manner as described with regard to the front pressure plate 13. Likewise, there is also provided two side fences 45 and 47. The rear pressure plate 37 operates in generally the same manner as the front pressure plate 13 and is constructed essentially identical to the front pressure plate. Thus, for the purposes of the herein invention, reference will be had most particularly to the operation of only one of the plates, with the understanding that both operate in the same manner as indicated.

Figure 4:
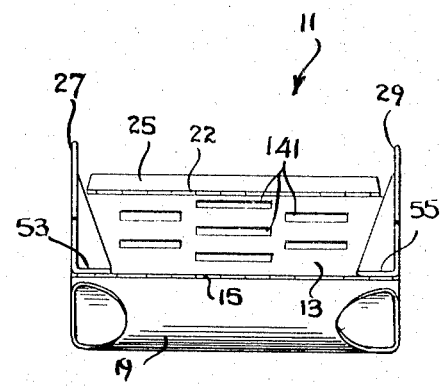
FIG. 4 is a view taken along 4—4 of FIG. 3.

Turning to FIGS. 3 and 4, there is seen the varying positions of the front pressure plate 13. The pressure plate 13 has downwardly extending side walls 49 on each side thereof. When the car is at maximum speed, the pressure plate 13 will be in a depressed position, shown in dotted outline form in FIG. 3, and in solid line in FIG. 7, whereby the pressure plate 13 and the second pivotal pressure plate 25 will be generally coextensive with the contour of the car such that the rear edge 23 of the plate 25 is adjacent the top surface 51 of the car preceding the cockpit. At initial speeds and at rest, the pressure plate 13 is in a raised position as seen in solid line in FIG. 3. Since the pressure plate is raised above the chassis, the side walls 49 serve to enclose the space between the pressure plate and the chassis 17 to prevent turbulence and the like from being created underneath the plate. When the pressure plate 13 is depressed at high speeds, then the side walls 49, as shown in dotted outline, are disposed within the chassis and are not visible from the outside of the vehicle. FIGS. 5 and 6 disclose the movement of the side fences 27 and 29 relative to the pressure plate 13. The fences 27 and 29 have inwardly extending bases 53 and 55, respectively. The bases each have a wide front end 57 and taper inwardly toward the fence adjacent the rear ends thereof so that the bases are wider at the front of the vehicle than they are at the rear. A reason for this is that, at lower speeds where it is desirable to increase the air pressure on the pressure plate 13, the fences will be opened at the front end as seen in FIG. 5. That is, they will be trimmed or pivoted to a position where they are wider apart at the front and closer together at the rear. The pivotal pressure plate 25 will be in an upward tilted position at lower speeds (as shown in broken line in FIG. 7) and the fences can come to rest close to the sides of the dam plate 25 as seen in FIG. 5. In the position of FIG. 5, it can be thus appreciated that the fences serve as an air scoop and serve to funnel a greater amount of air onto the upper surface of the pressure plate. Thus, when the front portions of the fences are so spread apart as seen in FIG. 5, the base portions 53 and 55 serve as a coextension of the pressure plate 13 to effectively increase the upper surface pressure area. When the car attains higher speeds the fences will move to the generally parallel front-to-back positions shown in FIG. 1.

FIG. 6 discloses the fences 27 and 29 during a turn of the car, both being pivoted in the same direction and parallel to each other. In this position of the fences for the front pressure plate, the car would be turning, making a right turn. The fences 45 and 47 for the rear pressure plate 37 are in the opposite, parallel positions. In these positions, the fences serve to stabilize the vehicle.

Figure 7:
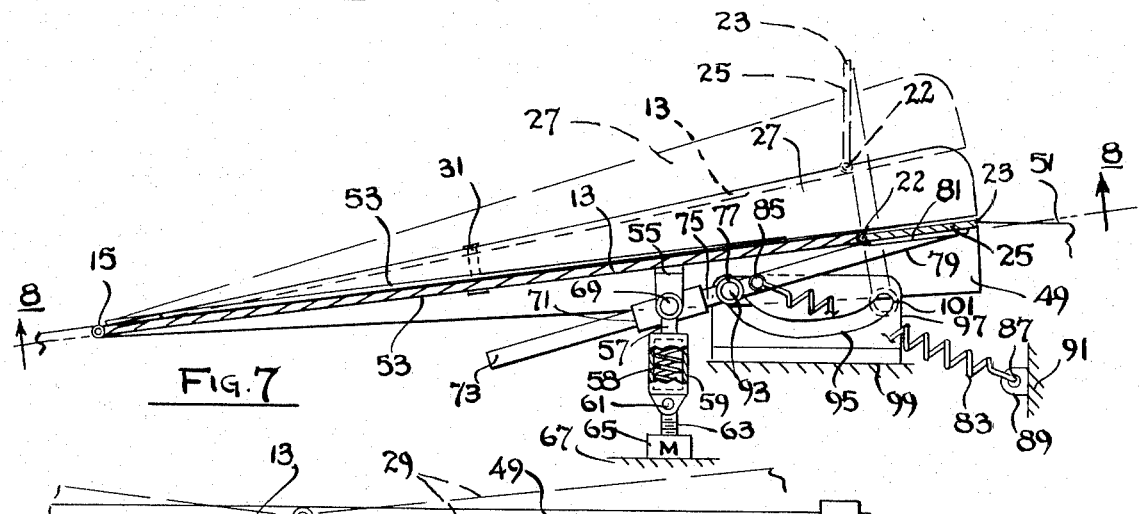
FIG. 7 is a partially sectioned cross sectional view of a mechanism for controlling a front pressure plate of a car of this invention.

Turning now to FIG. 7, there is particularly seen the mechanism for controlling the pressure plate 13 and pivotal plate 25 during the movement of the car. In general, the pressure plate 13 is normally biased into the raised position by a pair of springs 58. More particularly, depending downwardly from a lower surface 53 of pressure plate 13 are a pair of support struts 55, only one being seen in FIG. 7 since the two struts are coaligned on opposite sides of the pressure plate. Extending downwardly from each support strut 55 is a rigid arm 57 which in turn is connected to a spring 58 contained within a housing 59. At its lower end 61 each spring housing 59 is pivotally connected to a screw jack 63 which in turn is connected to a trim motor 65. The trim motors 65 are mounted on the bottom surface 67 of the chassis within the vehicle. In FIG. 7, the pressure plate 13 is seen in solid line in its lowermost position where downward force is exerted to compress the springs 58 This downward force is exerted by air pressure across the upper surface of the pressure plate 13. Despite the final speed reached, the springs 58 are such that the maximum compression thereof allows the plate 13 to reach the position seen in FIG. 7. At rest, or when the vehicle only begins to move, the upward force of the springs 58 have caused the pressure plate 13 to assume the dotted line position shown, its most elevated position. Stops 68 mounted on the bottom edges of the side walls 49 of the pressure plate (FIG. 8) and extending outwardly therefrom to engage the adjoining chassis, limit this upward movement. Thus, as the speed of the car increases, the pressure plate 13 is automatically lowered, due to the force of the air serving to compress the springs 58, until the point of maximum compression, as seeen in FIG. 7, is reached.

The trim motors 65 can thus be operated to vary the upward biasing force exerted by the springs 58. In this connection, since the stops 68 limit upward movement of the pressure plate 13, if the motors 65 are operated to raise the housings 59, the springs 58 are thereby partially compressed and greater downward force is required before further compression of the springs takes place, as compared to the downward force required to compress the springs from a less-compressed initial condition. Thus, the operating characteristics of the pressure plate 13 can be varied by adjustment of the trim motors 65. Further, while the drive would not normally operate the trim motors 65 while driving the car, it is possible to do so to adjust or compensate for various conditions encountered.

Though it has been indicated that two springs are utilized on each side of the pressure plate, it should be apparent that one large spring can be centrally disposed medially of the pressure plate in the same manner as indicated to serve the same purpose. The position, however, of separate compressive springs on either side of the pressure plate ensures better stabilization of the plate and equal force across the entire plate as it is compressed downwardly, thus preventing one side or the other from tilting more in a downward position, as the car corners or the like.

The second pivotal pressure plate 25 is spring biased and coupled to the pressure plate 13 so that it moves toward its lower position under increased air pressure as the pressure plate moves toward its lower position.

On each downward strut 55 there is pivotally mounted on an axle 69 a trim motor 71 through which there is slidably mounted a rod 73. The rod 73 normally is free sliding in the motor 71 which in such case merely serves as a sleeve for the rod. It is possible, however, for the driver to operate the motors 71 to positively control the movement of the rods 73 relative to the motors 71.

There may be circumstances where this would be desirable or where the apparatus malfunctioned. One end 75 of each rod 73, in turn, is pivotally connected at 77 to an arm 79. Each arm 79 is rigidly connected to a lower surface 81 of the pivotal pressure plate 25. A pair of springs 83 are provided, each being pivotally connected at one end 85 to one of the arms 79. The opposite end 87 of each spring 83 is pivotally connected to a mount 89 affixed to a portion 91 of the chassis. At the pivot connection 77 of each rod 73 to one of the arms 79 there is provided a sleeve 93 which is slidable in a curved slot 95 formed in one of a pair of plates 97. The plates 97 are rigidly secured to portions 99 at opposite sides of the chassis.

Now to explain the operation of the pivotal pressure plate 25. At high speeds, the plate 25 is forced by air pressure against it to a downward position coextensive with the surface of the pressure plate 13, as seen in solid line in FIG. 7. In this position the springs 83 are extended. In other words, the compressive force of the springs 83 is overcome by the air pressure on the dam plate. As the speeds decrease and the springs 58 force the pressure plate 13 upwardly, springs 83 in turn pull arms 79 so that sleeves 93 move in slots 95 toward a rear position 101 in the slots 95, to the point where the dam plate 25 is shown in an upward position in dotted outline in FIG. 7. As the sleeves 93 moves in slots 95, it can be seen that the arms 73 will slide freely relative to the trim motors or sleeves 71. Thus, at start the pivotal plate 25 is generally upright and as speed increases, it progresses to the depressed or generally vertical position. It can be seen that the springs 58 utilized for controlling the pressure plate 13 and the springs 83 controlling the plate 25 should preferably be related to each other so that the amount of force required to depress the pressure plate 13 will be essentially equivalent to the amount of force required to depress the plate 25 as the speed of the car increases.

Figure 8:
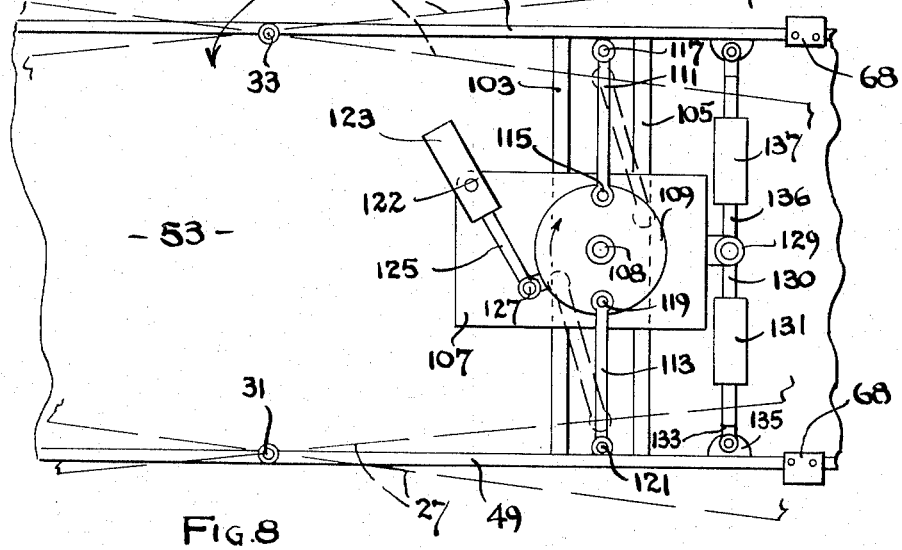
FIG. 8 is a view taken along line 8—8 of FIG. 7.

Turning now to FIG. 8, there is seen a bottom view of a pressure plate 13 particularly showing a mechanism for controlling the side fences 27 and 29 on the pressure plate. This particular view omits the details of the mechanism for controlling the pressure and dam plates for purposes of clarity. Two parallel tracks 103 and 105 are mounted on the bottom surface 53 of the pressure plate 13. A support plate 107 is slidably mounted on the tracks 103 and 105 so that it can move from one fence toward the opposite fence. Pivotally mounted on the plate 107 at point 108 is a circular disc 109. When the fences are coaligned with the sides of the vehicle, the plate 107 is medially disposed between the two fences on tracks 103 and 105, as seen in FIG. 8. Connected to the disc 109 are arms 111 and 113, mounted 180° apart and each extending outwardly from the disk to one of the fences. Thus, arm 111 is pivotally connected at one end 115 to the disc 109 and at the opposite end 117 to fence 29. Correspondingly, arm 113 is pivotally connected to the disc at one end 119 while at the opposite end is pivotally connected at 121 to fence 27. Additionally, pivotally mounted on support plate 107 at point 122 is a controllable and adjustable biasing unit 123 having an arm 125 which is pivotally connected at 127 to a portion of the disc 109. The arm ends 117 and 121 and the fences may be connected by upright rods that extend through slots (not shown) in pressure plate 13 and side walls 49. The slots may have sealing means such as flexible overflaps to minimize air leakage therethrough. The unit 123 normally biases the rotatable disc 109 in the clockwise direction to a position where the arms 111 and 113 are in the positions shown in broken line. This causes the rear ends of the fences 27 and 29 to converge inwardly toward the dam plate and assume a funnel-effect starting position such as shown in FIG. 5. As noted above, when the car builds up speed, the air flow on the fences moves them to the generally fore-to-aft parallel position shown in FIG. 1, against the spring or biasing force of unit 123.

Additionally, there is an arm 129 provided on the plate 107. The plate 107 is resiliently biased into a central position such as shown in FIG. 8 as by a pair of counteracting controllable and adjustable biasing units 131 and 137. A rod 130 of one biasing unit 131 is connected to the arm 129, while the opposite end 133 of the unit 131 is connected to an anchor 135 on one side of the plate 13. A rod 136 of the other biasing unit 137 is connected to the arm 129, while the opposite end of the unit 137 is connected to an anchor on the opposite side of the plate 13. As the vehicle goes into a turn, airstream pressure (weather vane principle) force is exerted on the fences, causing compression or expansion of the units 131 and 137 depending upon the direction of the turn. As the units 131 and 137 expand or contact, the plate 107 will correspondingly move from side to side on the tracks 103 and 105, and through the arms 111 and 113, will keep the fences parallel with each other, either facing to the right or left of the car, as, for example, seen in FIG. 6 and in dotted outline in FIG. 8. The fences 27 and 29 will normally be allowed to operate freely during movement of the car, responsive only to control by the biasing means and the air flow. In some instances, the driver may wish to operate the unit 123 and/or the units 131 and 137 to override or further control fence movement or positions.

The units 123, 131 and 137 can also be adjusted to vary the spring or biasing tension exerted. Biasing units such as this which may be pneumatic, mechanical or electrical, are well known in the art and will not be described in detail. Similarly, controls for such units which can be selectively and remotely operated by the driver are also well known, are not described in deail. Adjustment of the biasing tension can be achieved by such remote controls and/or may be achieved prior to driving the car by a suitable manual adjustment of the unit. The above remarks also apply in general to the trim motor 65 and the sleeve motor 71.

The above discussion has been with regard to the front pressure plate and its operation in the herein device. It should be understood that the rear pressure plate 37 will operate essentially the same as the front pressure plate 13, including having the mechanism shown in FIGS. 7 and 8 for effectively controlling the dam plate relationship to the pressure plate and the movement of the side fences 45 and 47.

In order to maintain the air on the upper surface of the pressure plates 13 and 37, it is preferred that air deflector be provided on the pressure plate surfaces. The deflectors can, for example, be small pieces of metal 141 perpendicular to the surface of the pressure plate, and can be either secured by welding, rivets, or the like thereto. FIG. 5 shows a staggered arrangement of the deflectors 141 across the surface serving to effectively and proportionately break up the flow of the air on the front pressure plate 13. Other arrangements and designs of air deflectors (including variable ones), can, of course, be utilized. The rear pressure plate arrangement is provided with air deflectors as shown best in FIGS. 1, 2 and 2A. Essentially, a small rib or plate 143 is secured around the periphery of the car, just forward of the rear end thereof. This plate 143 extends generally normal to the surface of the car, is shown best in FIG. 2A. This deflector plate 143 breaks the flow of air past the rear of the car and tends to turn it inwardly and into the area directly behind the rear end of the car, which tends to reduce the amount of negative pressure or cavitation area. As shown in FIGS. 1 and 2, the rib or plate 143 extends along the chassis surface, over the rear edge of the pressure plate 37 adjacent the plate 25, and across the outer edge of the foward surface of the plate 25 itself. It will be noted that the illustrated rear fences 45 and 47 are foreshortened at the rear so as not to interfere whe they tilt to one side or the other with the portions of plate 143 on the rear outside edges of the pressure plate 37.

I claim:

1. A chassis construction for a racing car to improve stability, the car having front wheels and rear wheels, said chassis construction comprising:

a front chassis portion having a generally horizontal front upper surface and means mounted thereon defining a front pressure surface essentially within said front chassis portion and disposed generally over the front wheels of the car, said front pressure surface being generally horizontal and in general alignment with said chassis front upper surface, but being inclined upwardly toward the rear of the car, said front pressure surface being movable from said inclined position to a lower more horizontal position as the speed of the car increases, and a rear chassis portion having a generally horizontal rear upper surface and means mounted thereon defining a rear pressure surface essentially within said rear chassis portion and disposed generally over the rear wheels of the car, said rear pressure surface being generally horizontal and in general alignment with said chassis rear upper surface, but being inclined upwardly toward the rear of the car, said rear pressure surface being movable from said inclined position to a lower more horizontal position as the speed of the car increases.

2. The chassis construction of claim 1 including means biasing each of said pressure surfaces toward said upwardly inclined positions.

3. The chassis construction of claim 2 including means for adjusting the biasing force applied by said biasing means.

4. The chassis construction of claim 1 wherein said means defining said pressure surfaces are each generally flat plates pivotally mounted on said associated chassis portions.

5. The chassis construction of claim 4 further including upright second pressure plate members pivotally mounted along and above the rear of each of said flat plates.

6. The chassis construction of claim 5 including means biasing said flat plates and said second pivotal plate members upwardly to their respective upwardly inclined and upright positions.

7. The chassis construction of claim 1 wherein each of said pressure surfaces extend substantially from one side of the associated chassis portion to the other.

8. The chassis construction of claim 7 wherein said pressure surfaces extend over a major portion of the length of the car.

9. The chassis construction of claim 1 wherein said rear pressure surface has air deflector means thereon.

10. The chassis construction of claim 9 wherein said air deflector means comprises an upstanding rib extending around at least a portion of the rear end of said rear chassis portion.

11. The chassis construction of claim 1 wherein upright pressure plate is disposed across and above the rear of each of said pressure surfaces.

12. The chassis construction of claim 11 wherein each of said pressure plate means is mounted for movement toward a lower position as the speed of the car increases.

13. The chassis construction of claim 12 including means for biasing said pressure plate means toward said upright position.

14. The chassis construction of claim 11 wherein upright side fence means are disposed along and above the sides of each of said pressure surfaces.

15. The chassis construction of claim 14 wherein said side fence means are mounted for side-to-side movement.

16. The chassis construction of claim 15 including means supporting said fence means and urging them to a position where the forward ends of said fence means are wider apart than the rear ends thereof.

17. The chassis construction of claim 6 further including upright side fence members extending along and above the sides of each of said pressure plates.

each side fence members being pivotally mounted on a vertical axis for side-to-side movement.

* * * * *